(12) United States Patent
Tomita

(10) Patent No.: US 7,990,641 B2
(45) Date of Patent: Aug. 2, 2011

(54) PROXIMITY DETECTION METHOD FOR MAGNETIC HEAD AND RECORDING MEDIUM

(75) Inventor: Craig L. Tomita, Pleasanton, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 12/187,327

(22) Filed: Aug. 6, 2008

(65) Prior Publication Data

US 2010/0033860 A1  Feb. 11, 2010

(51) Int. Cl.
*G11B 27/36* (2006.01)
*G11B 21/02* (2006.01)

(52) U.S. Cl. ............................................. 360/31; 360/75

(58) Field of Classification Search .................. None
See application file for complete search history.

(56) References Cited

U.S. PATENT DOCUMENTS

| 7,158,325 B1 * | 1/2007 | Hu et al. .......................... 360/69 |
| 7,180,692 B1 | 2/2007 | Che et al. |
| 7,215,495 B1 | 5/2007 | Che et al. |
| 7,324,299 B1 * | 1/2008 | Schreck et al. .................. 360/75 |
| 7,349,170 B1 | 3/2008 | Rudman et al. |
| 7,359,139 B1 | 4/2008 | Wu et al. |

OTHER PUBLICATIONS

Tang, et al. "Overview of Fly Height Control Applications in Perpendicular Magnetic Recording," IEEE Transactions on Magnetics, vol. 43, No. 2, Feb. 2007, pp. 709-714.

* cited by examiner

*Primary Examiner* — Daniell L Negrón
(74) *Attorney, Agent, or Firm* — Patterson & Sheridan, LLP

(57) ABSTRACT

Touchdown is detected between an R/W head and disk by determining the variance in the frequency domain of a baseline position error signal (PES) and a PES measured after incrementally increasing the DFH control signal. To quantify the variance in the frequency domain, a discrete Fourier transform of the baseline PES and of each PES produced for a given DFH control signal is used. A band-limited PES variance is used to improve touchdown detection, but is not a requirement of this method.

18 Claims, 7 Drawing Sheets

PROXIMITY DETECTION METHOD FOR MAGNETIC HEAD AND RECORDING MEDIUM

BACKGROUND OF THE INVENTION

1. Field of the Invention

Embodiments of the present invention relate generally to magnetic disk drives and, more particularly, to a proximity detection method for a magnetic head and a recording medium.

2. Description of the Related Art

In a hard disk drive (HDD), the spacing between a magnetic recording head and magnetic storage disk, referred to as "head clearance," is a critical performance parameter. Reducing head clearance during reading and writing operations can reduce bit error rate and allow accurate storage and retrieval of data that are stored on a disk at very high linear densities. Dynamic fly-height (DFH) control of read/write (R/W) heads is commonly used by modern HDDs to allow low enough fly-heights for high-density storage media while maintaining sufficient head clearance over different head locations and drive temperatures.

For proper operation of an HDD, DFH control schemes generally require some form of calibration to determine how the fly height of an R/W head varies with stroke location, temperature, and applied DFH control signal. An important step in calibrating DFH control is determination of touchdown, i.e., when the R/W head actually makes contact with the storage medium. During normal operation such contact is avoided, but as part of calibration, touchdown provides an absolute benchmark of R/W head position relative to a disk, and is used in subsequent calibration procedures. For calibration at a given stroke location and temperature, the DFH control signal is stepped through increasing values until a portion of the R/W head begins to contact the disk. Given the touchdown control level and the actuation efficiency, i.e., the amount of fly-height change per unit of applied control signal, a DFH control algorithm can regulate the fly-height accurately for an R/W head as a function of location and temperature.

A touchdown-detection algorithm is commonly used to control the HDD during HDD self-test when determining touchdown. Ideally, such a touchdown-detection algorithm can be performed by an HDD without the need for external measurement equipment. When no external equipment is needed for touchdown determination—other than the mechanical support and power supply already required for HDD self-test—the HDD test process is significantly expedited. This is because the setup and breakdown of each HDD before and after self-test can remain unchanged, thereby avoiding complications to the self-test process. In addition, a touchdown-detection algorithm should reliably determine touchdown. Declaring a touchdown power that is too low results in the R/W head flying higher than the optimal height, which can result in poor read/write quality. Declaring a touchdown power that is too high results in the R/W head flying lower than the optimal height, which can result in undesired head/disk contact and failure in the field. Further, a touchdown-detection algorithm should not require excessive head/disk contact during the measurement process for robust calibration of the R/W head position, to minimize damage to the R/W head and disk surface.

There are a number of methods known in the art for determining touchdown. One approach is to observe the gain of the read channel variable gain amplifier (VGA) as DFH power is increased, and declare touchdown when further increases in DFH power do not produce significant decreases in VGA gain. However, to detect the point at which VGA gain decreases, the DFH power must be driven past the point of initial head/disk contact, which is undesirable. Another approach involves observing acoustic output of the HDD by placing a microphone near the R/W head and declaring touchdown when a pre-determined level of acoustic output is detected. Because installation and removal of the microphone can significantly complicate setup of an HDD for the self-test process, this method is also undesirable. Another approach involves observing overall servo track misregistration (TMR) of the R/W head as DFH power is increased and declaring touchdown when the TMR exceeds a specified level. As with the VGA gain approach, accurate determination of touchdown requires overdriving the R/W head past the point of initial contact with the disk. Therefore, this approach is also undesirable for determining touchdown. In yet another approach, modulation of the read signal is observed from the R/W head, and touchdown is declared when a specified level of modulation is reached. Overdriving of the R/W head past initial contact with the disk is necessary for this approach as well.

In light of the above, there is a need for a reliable method of touchdown detection that can be performed by an HDD during the self-test process without additional measurement equipment and does not require excessive head/disk contact.

SUMMARY OF THE INVENTION

An embodiment of the invention provides a method for detecting touchdown between a magnetic head and a recording medium by evaluating position error signals in the frequency domain. In this embodiment, touchdown is detected based on variances in the position error signals at each of a discrete number of frequencies that are within a selected frequency band in the frequency domain. This frequency band is selected so that portions of the position error signal spectrum that either do not change at touchdown or change for other reasons unrelated to touchdown are ignored.

Another embodiment of the invention provides a method for determining a touchdown dynamic fly height (DFH) power setting for a read/write head. In this embodiment, a number of different techniques are used to detect touchdown, and for each of the different techniques, DFH power setting is recorded when touchdown is detected. The lowest of the recorded DFH power settings is then selected as the touchdown DFH power setting.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate a method for detecting touchdown between an R/W head and disk by determining the variance in the frequency domain of a baseline position error signal (PES) and a PES measured after incrementally increasing the DFH control signal. To quantify the variance in the frequency domain, a discrete Fourier transform (DFT) of the baseline PES and of each PES produced for a given DFH control signal is used. In one embodiment, a band-limited PES variance may be used to improve sensitivity to touchdown, in which a variance is only measured for a selected portion of the DFT spectrum.

Figure 1:
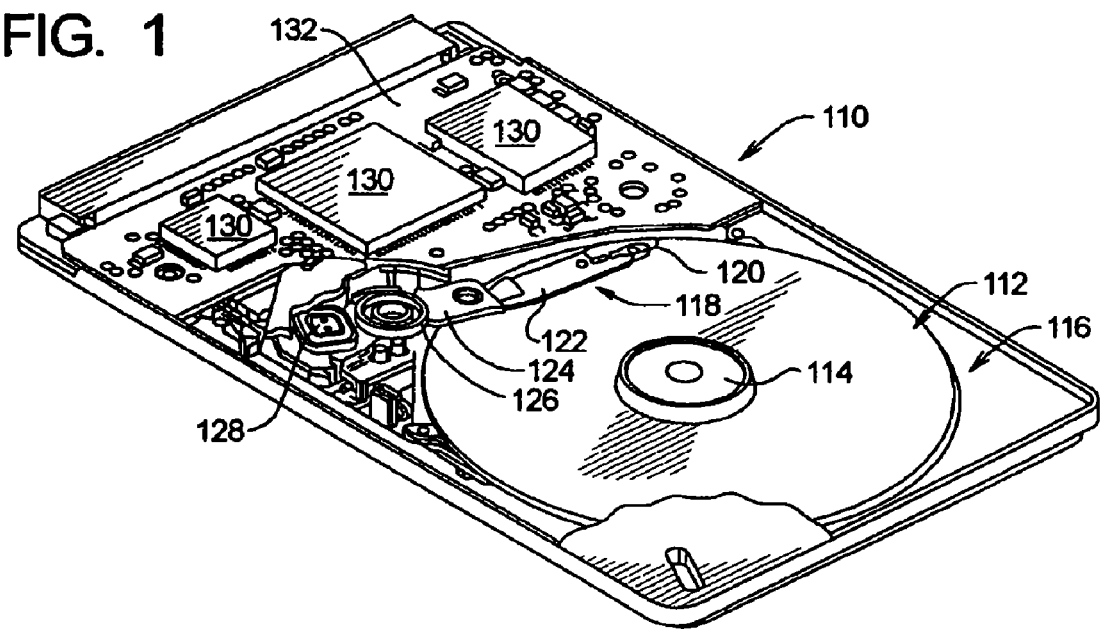
FIG. 1 is a perspective view of a disk drive that can benefit from embodiments of the invention described herein.

FIG. 1 is a perspective view of a disk drive 110 that can benefit from embodiments of the invention as described herein. For clarity, disk drive 110 is illustrated without a top cover. Disk drive 110 includes a magnetic storage disk 112 that is rotated by a spindle motor 114. 200 Spindle motor 114 is mounted on a base plate 116. An actuator arm assembly 118 is also mounted on base plate 116, and includes an R/W head 120 mounted on a flexure arm 122. Flexure arm 122 is attached to an actuator arm 124 that rotates about a bearing assembly 126. Voice coil motor 128 moves R/W head 120 relative to magnetic storage disk 112, thereby positioning R/W head 120 over the desired concentric data storage track disposed on the surface 112A of magnetic storage disk 112. Spindle motor 114, R/W head 120, and voice coil motor 128 are coupled to electronic circuits 130, which are mounted on a printed circuit board 132. The electronic circuits 130 include a read channel, a microprocessor-based controller, and random access memory (RAM). For clarity of description, disk drive 110 is illustrated with a single magnetic storage disk 112 and actuator arm assembly 118, however, disk drive 110 may also include multiple disks 112 and multiple actuator arm assemblies 118.

Figure 2:
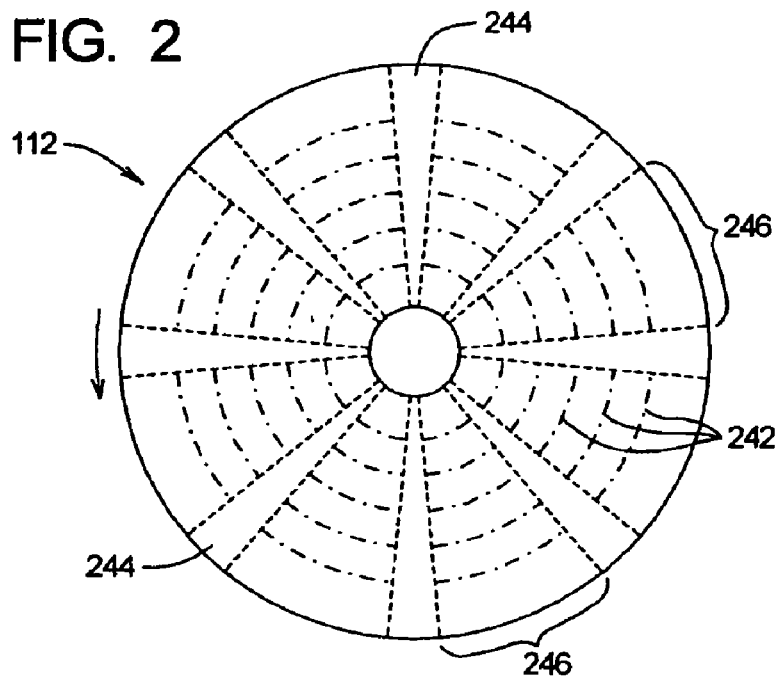
FIG. 2 illustrates a magnetic storage disk.

FIG. 2 illustrates magnetic storage disk 112 with data organized in a typical manner well known in the art. Magnetic storage disk 112 includes concentric data storage tracks 242 for storing data. Each of concentric data storage tracks 242 is schematically illustrated as a centerline, however each of concentric data storage tracks 242 occupies a finite width about a corresponding centerline. Magnetic storage disk 112 includes radially aligned servo spokes 244, also referred to as servo wedges, that cross concentric data storage tracks 242 and store servo information in servo sectors in concentric data storage tracks 242. The servo information is read by R/W head 120 during read and write operations to position the head 120 above a desired track 242. For clarity, a small number of concentric data storage tracks 242 and servo spokes 244 are shown. Typically, the actual number of concentric data storage tracks 242 and servo spokes 244 included on magnetic storage disk 112 is considerably larger.

Figure 3:
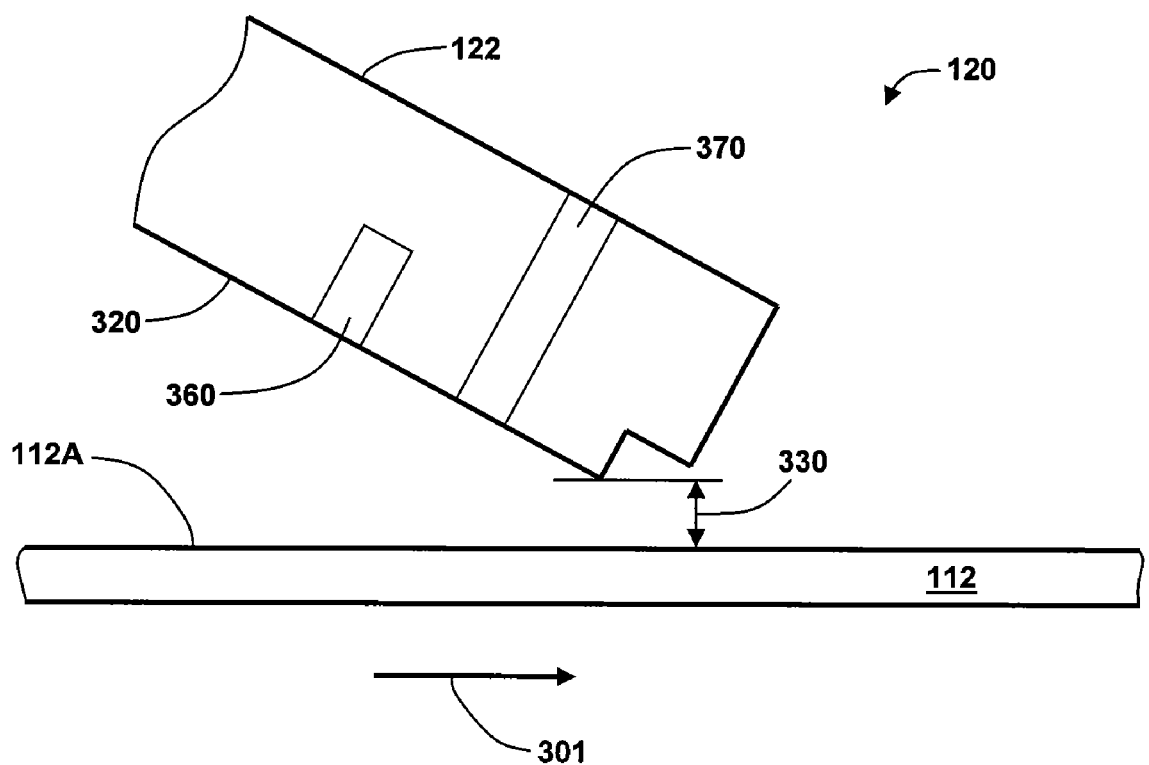
FIG. 3 is a schematic side view of an R/W head positioned over a surface of magnetic storage disk.

FIG. 3 is a schematic side view of R/W head 120 positioned over surface 112A of magnetic storage disk 112. R/W head 120 includes a read head 360, a write head 370, and an air-bearing surface (ABS) 320, which faces toward surface 112A of magnetic storage disk 112. The rotation of magnetic storage disk 112 in the direction of arrow 301 generates an air bearing between ABS 320 of R/W head 120. During operation of disk drive 110, the air bearing counterbalances the slight spring force produced by the suspension of flexure arm 122, thereby holding R/W head 120 a small, substantially constant fly-height 330 above surface 112A. With the high linear densities now in use for data storage on modern HDDs, fly-height 330 is commonly less than 10 nanometers and may be as small as 3 nanometers.

In operation, a thermal or mechanical fly-height actuator (not shown) disposed on flexure arm 122 varies the vertical position of R/W head 120 over surface 112A as necessary to maintain an optimal fly-height 330. The fly-height actuator is controlled by a fly-height controller contained in electronic circuits 130. The fly-height controller steps R/W head 120 incrementally closer to or farther from surface 112A by increasing or decreasing the DFH control signal applied to the fly-height actuator, where the DFH control signal is measured in digital-to-analog converter (DAC) counts. For example, when the applied DFH control signal is at a minimum, i.e., zero DAC counts, fly height 330 is at its maximum value. The object of a touchdown determination algorithm is to quantify the number of DAC counts applied to the fly-height actuator that result in actual or imminent contact between R/W head 120 and surface 112A.

Precise alignment of R/W head 120 over a desired concentric data storage track 242 is monitored by means of the position error signal (PES). As is commonly known in the art, a PES is produced by servo bursts located in servo spokes 244 when magnetic storage disk 112 is rotated in proximity to R/W head 120. The PES allows the microprocessor-based controller in electronic circuits 130 to determine the position of R/W head 120 relative to a given concentric data storage track 242. As noted above, embodiments of the invention contemplate declaring touchdown of R/W head 120 by detecting a specified variance of PES in the frequency domain relative to a baseline PES spectrum.

Figure 4A:
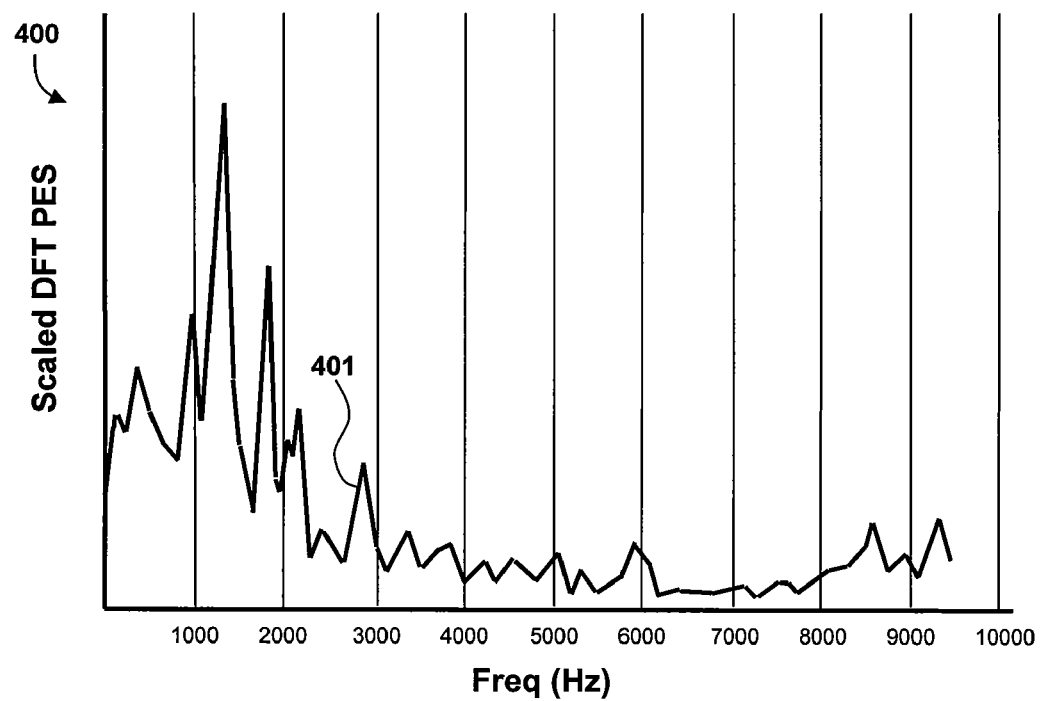
FIG. 4A is a graph of a baseline PES frequency distribution.

FIG. 4A is a graph 400 of a baseline PES frequency distribution 401. Baseline PES frequency distribution 401 is a discrete Fourier transform (DFT) of a PES produced during track following by R/W head 120 when it is known that R/W head 120 is not proximate surface 112A, e.g., at zero DAC counts. The horizontal axis of graph 400 represents the frequency of the PES and has a range of 0 to 10,000 Hz. The vertical axis of graph 400 represents the scaled magnitude of PES spectral components. In the example illustrated in FIG. 4A, PES frequency distribution 401 ends at approximately 9500 Hz, which is the Nyquist frequency of an HDD having approximately 150 servo wedges and rotating at 120 Hz. One of skill in the art will appreciate that the frequency range of a PES frequency distribution used for touchdown detection will vary as a function of the Nyquist frequency of the PES, which can differ according to the design and operation of a given HDD.

The values for baseline PES frequency distribution 401 may be generated in a number of ways. In one embodiment, the PES for one or more runs of magnetic storage disk 112 is measured while R/W head 120 is positioned away from surface 112A of magnetic storage disk 112, and the average PES value at each frequency over the different runs is used to generate PES frequency distribution 401. One run is considered a distinct, non-consecutive revolution of magnetic storage disk 112. Thus, all PES measurements are taken with the DFH control signal at zero DAC counts. In another embodiment, PES is measured and averaged over multiple runs to generate PES frequency distribution 401, where each run is performed with R/W head 120 positioned at a slightly different height above surface 112A. For example, 10 runs may be used with DFH power at 0 DAC counts for the first run, 1 DAC counts for the second run, 2 DAC counts for the third run, and so on. Other suitable methods of establishing baseline PES frequency distribution 401 may be devised by one of skill in the art upon reading the disclosure herein.

Figure 4B:
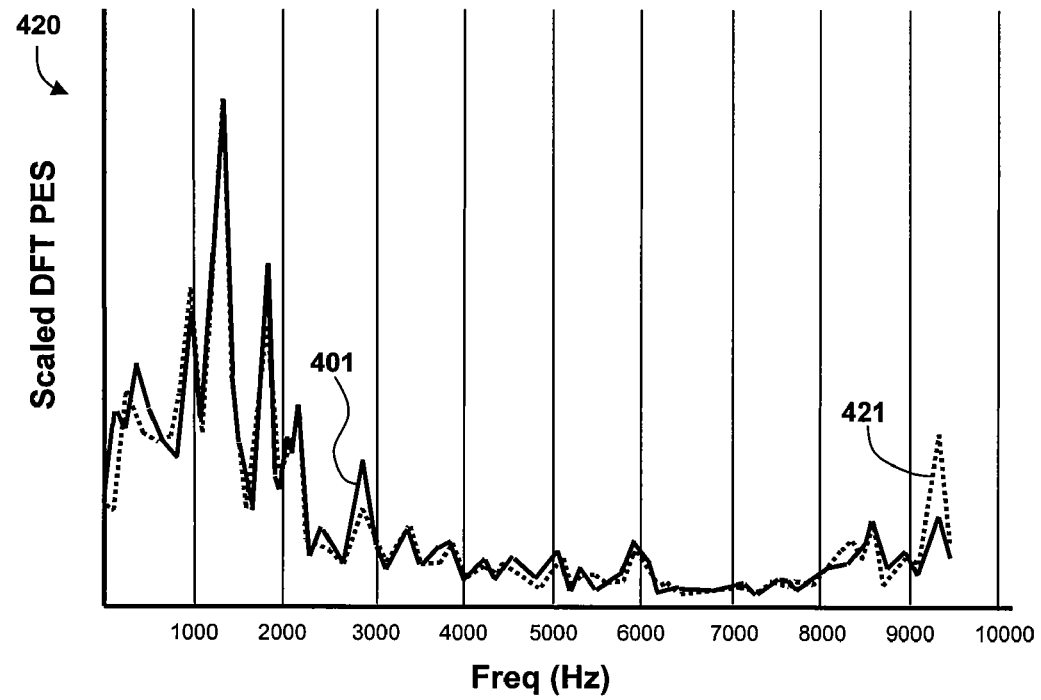
FIG. 4B is a graph of a PES frequency distribution superimposed on a baseline PES frequency distribution.

FIG. 4B is a graph 420 of a PES frequency distribution 421 superimposed on baseline PES frequency distribution 401. PES frequency distribution 421 is measured at initial touchdown of R/W head 120 to surface 112A in FIG. 3. Similar to baseline PES frequency distribution 401, PES output may be averaged over multiple runs to generate PES frequency distribution 421. Alternatively, PES frequency distribution 421 may be the average of multiple runs, where one or more of the greatest variances and one or more of the smallest variances are thrown out before averaging. In either case, the DFH power is held at the same DAC count for each run. In this way, R/W head 120 is held in the same position relative to surface 112A for all runs used to generate PES frequency distribution 421. In the example illustrated in FIG. 4B, PES frequency distribution 421 represents PES output at 116 DAC counts and baseline PES frequency distribution 401 represents PES output at 0 DAC counts. As depicted in FIG. 4B, the two spectra are substantially the same except for a noticeable peak in PES frequency distribution 421 at approximately 9.3 kHz. This high-frequency increase in the energy of the PES output indicates initial touchdown of R/W head 120 with surface 112A.

Figure 4C:
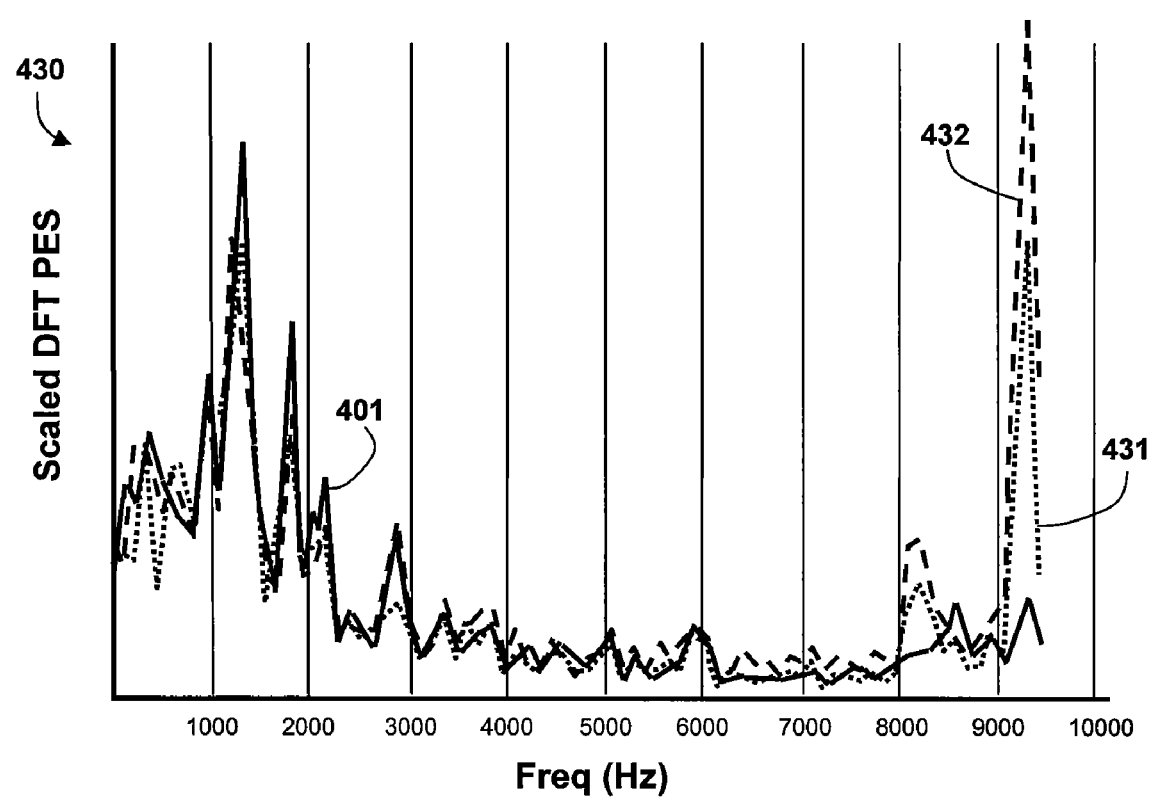
FIG. 4C is a graph of two PES frequency distributions superimposed on a baseline PES frequency distribution.

FIG. 4C is a graph 430 of PES frequency distributions 431, 432 superimposed on baseline PES frequency distribution 401. PES frequency distribution 431 is measured at 120 DAC counts, i.e., after R/W head 120 has been overdriven against surface 112A by 4 DAC counts beyond initial touchdown, which occurred at 116 DAC counts. PES frequency distribution 432 is measured at 124 DAC counts. As shown in FIG. 4C, PES frequency distribution continues to change over a significant frequency band as R/W head 120 is further overdriven against surface 112A, particularly in the higher frequency portion of the PES spectrum.

Given the quantifiable change in PES frequency distribution demonstrated to take place upon touchdown, a number of numerical methods may be used to declare touchdown based on a measured PES spectrum relative to a baseline PES spectrum. In one embodiment, touchdown is declared when the variance between a measured PES spectrum and a baseline PES spectrum exceeds a specified quantity. The variance may be a simple sum of the difference in PES magnitude at all frequencies, or, preferably, the sum over all frequencies of the mean of the difference in PES magnitude at each frequency squared. Alternatively, the total magnitude of the measured PES spectrum can be compared to the magnitude of the baseline PES spectrum. Other methods of calculating the variance between the baseline PES spectrum and the measured PES spectrum can be readily devised by one of ordinary skill in the art. However, summing the mean of the difference in PES magnitude squared to quantify variance advantageously increases the sensitivity of the touchdown detection algorithm by including both amplitude increases and decreases of the measured PES spectrum relative to the baseline. This is because some frequencies may decrease below the baseline value due to damping and other effects at initial touchdown. Thus, in some situations, the total PES energy of PES may not increase significantly when touchdown first occurs, and a variance calculation based on the increase of the total PES energy may delay declaration of touchdown. Equation 1 provides one example of quantifying the variance of a measured PES spectrum at a given DFH power, i.e., DAC count, from a baseline PES spectrum:

$$\mathrm{Var}(PES)_{DAC} \equiv \frac{1}{n}\sum_{j=1}^{n}(PES_j - PES_{BASELINE})^2 \qquad \text{Equation (1)}$$

where n=the number of discrete frequencies measured in the PES spectra, and $PES_j$=the magnitude of PES for each discrete frequency, j.

As noted above, in one embodiment, touchdown is declared when the variance between a measured PES spectrum and a baseline PES spectrum exceeds a specified quantity. Once the variance is calculated, e.g., see Equation 1, touchdown may be declared based on a number of numerical methods. For example, the first DFH power at which the variance of the measured PES spectrum exceeds a baseline PES variance by a specified multiplicative factor, e.g., 1.5, may be declared as the touchdown power. Alternatively, the first DFH power at which the variance of the measured PES spectrum exceeds a baseline PES variance by a fixed quantity may instead be declared as the touchdown power. One of skill in the art, upon reading the disclosure herein, can devise a suitable selection criterion for declaring touchdown power based on the design of a given HDD and the process control requirements for manufacturing the HDD. In one embodiment, one or more confirmation runs may also be performed once touchdown is declared, in which the PES at the declared touchdown power is re-measured.

In one embodiment, only a limited portion of the PES spectrum is used to determine touchdown, i.e., a band-limited PES variance is calculated. In this way, the sensitivity of the touchdown detection algorithm is substantially improved, since portions of the PES spectrum that either do not change at touchdown or that change for other reasons unrelated to touchdown are ignored by the algorithm. Referring back FIGS. 4B, 4C, it is evident that changes in the PES spectrum that occur at touchdown are found in a limited portion of the spectrum, i.e., the higher frequency region between about 6 kHz and the Nyquist frequency of the PES. The inventor has observed that variance in the lower frequency portions of the PES spectrum, particularly in the frequency range of 0-2000 Hz, is dominated by other noise sources not associated with touchdown, including spindle motor vibration (500-800 Hz), test stand vibration (10s-100s of Hz), and disk-flapping modes and arm assembly modes (1-2 kHz). In addition, the low frequency beating (generally in the 10s of Hz) produced by any such resonant vibration sources that are mechanically coupled and closely matched in frequency can generate another source of low frequency variance in PES signal, such as the 15 Hz beating generated by a 1215 Hz arm assembly vibration mode and a 1230 Hz disk "umbrella" vibration mode.

Figure 5A:
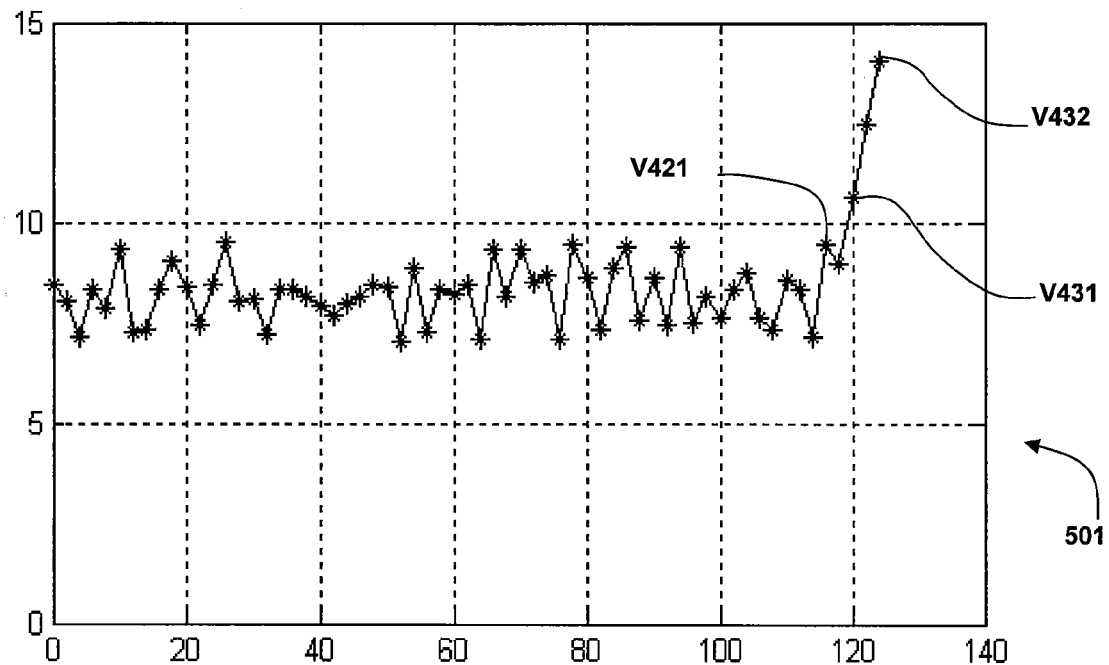
FIGS. 5A, 5B are graphs of PES variance measured against DFH power.

Such lower frequency variance in the PES signal can be eliminated by selecting a lower bound to the band-limited PES variation algorithm, thereby improving the signal-to-noise ratio of the touchdown algorithm. FIG. 5A is a graph

501 of PES variance measured against DFH power, in DAC counts, where the PES variance at each DAC count is measured over the entire frequency range using Equation 1. Each data point included in graph 501 represents the PES variance of a measured PES spectrum at one DFH power from a baseline PES spectrum. For example, the PES variance of PES frequency distribution 421 is labeled in FIG. 5A as V421. Similarly, the PES variance of PES frequency distributions 431, 432 are labeled in FIG. 5A as V431, V432, respectively. As shown, PES variance is substantially constant until touchdown occurs, and then increases noticeably. However, by applying a band-limited PES variance algorithm to the same data set, the signal-to-noise ratio for PES variance associated with touchdown can be significantly increased.

Figure 5B:
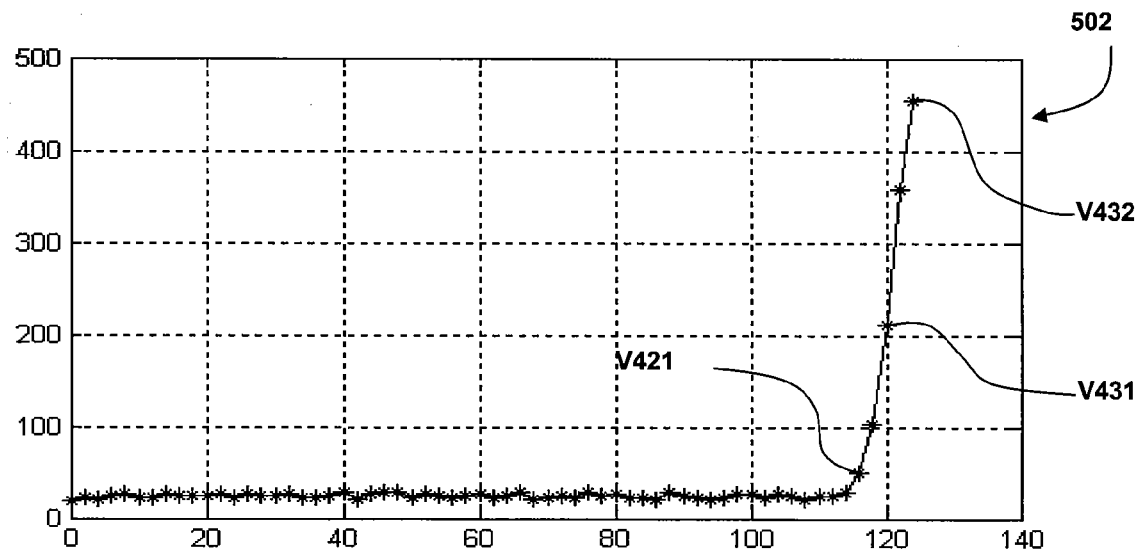

FIG. 5B is a graph 502 of PES variance measured against DFH power, in DAC counts, where the PES variance at each DAC count is measured over a limited portion of the frequency range, i.e., over a limited PES spectrum. In the example illustrated in FIG. 5B, the frequency range used to calculate variance for each DAC count is the band between 6 kHz and the Nyquist frequency of the PES signal, i.e., approximately 9.4 kHz. Because the lower bound of 6 kHz removes PES variance unrelated to touchdown from the calculation, the signal-to-noise ratio of the algorithm is substantially improved, and, as shown in FIG. 5B, the onset of touchdown is clearly indicated at 116 DAC counts, which is labeled V421.

The inventor has observed that touchdown generally produces variance at frequencies higher than about half the Nyquist frequency of PES signal, i.e., on the order of 5 kHz and greater. However, due to the large number of possible resonances in a mechanical system, e.g., first, second, and third torsion modes of each mechanical member, bending modes, etc., the use of a lower bound at half the Nyquist frequency for the band-limited PES variance algorithm is not considered universally applicable to any HDD. For example, for some HDD designs, it may be preferred to reduce the lower bound to 2 kHz or less. Alternatively, for some HDD designs, it may be preferred to calculate PES variance using a band-limited PES algorithm that includes multiple frequency bands, rather than a single high-frequency band, as described above in conjunction with FIG. 5B. For example, PES variation may be calculated between 4-6 kHz and 8-10 kHz for each DAC count. One of skill in the art, upon reading the disclosure herein, can devise a band-limited PES algorithm to detect touchdown based on the measured behavior of any particular HDD design at touchdown.

Figure 6:
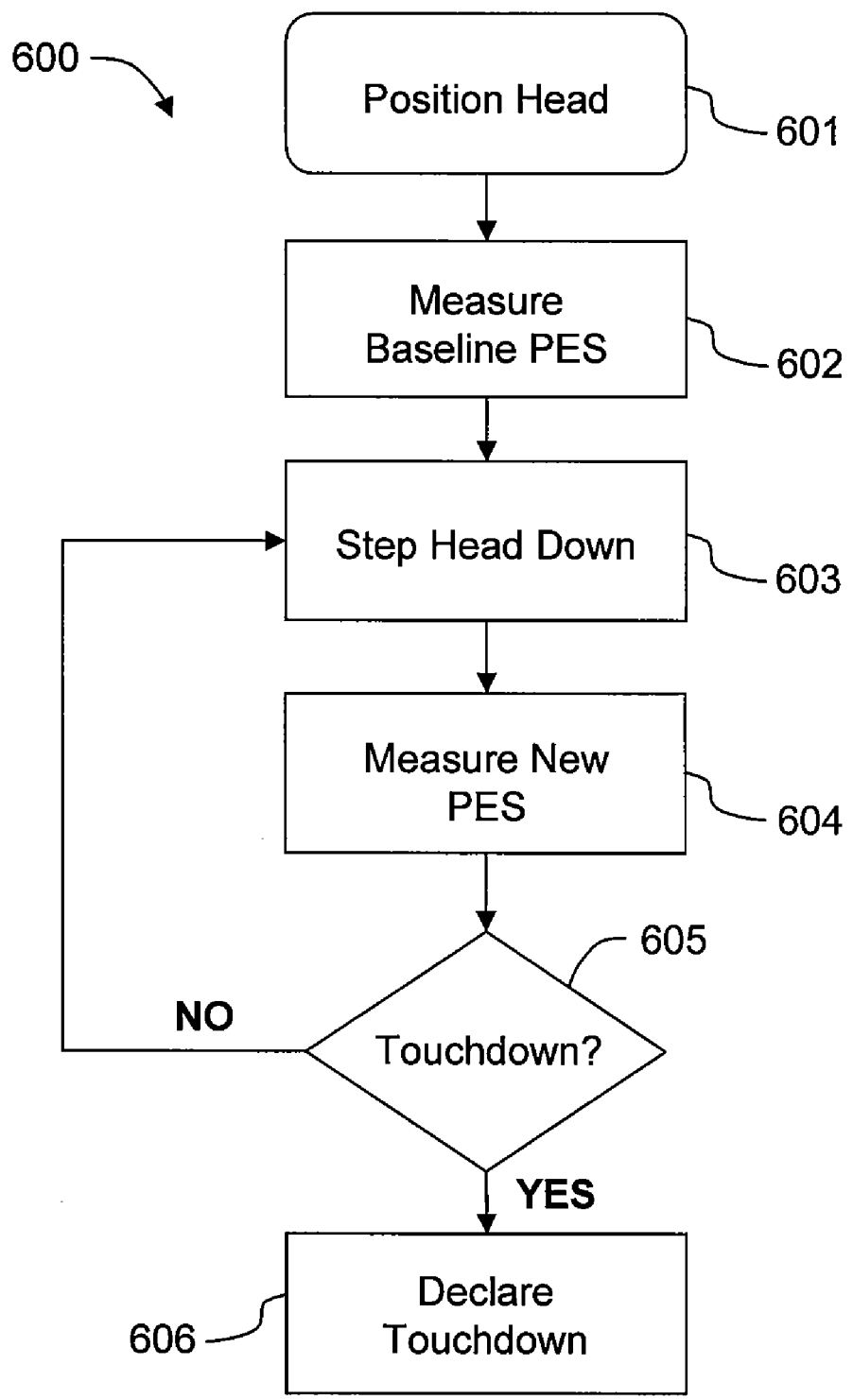
FIG. 6 is a flow diagram illustrating the method for determining touchdown of an R/W head against a magnetic storage disk, according to an embodiment of the invention.

FIG. 6 is a flow diagram summarizing a method 600 for determining touchdown of an R/W head against a magnetic storage disk, according to an embodiment of the invention. In step 601, the R/W head, such as R/W head 120 in FIG. 1, is positioned at a maximum distance from a magnetic storage disk. For disk drive 110, this is accomplished by reducing the DFH power to zero, i.e., 0 DAC counts.

In step 602, a baseline PES is measured and converted to a DFT by methods commonly known in the art. The baseline measurement may be based on multiple rotations of the magnetic storage disk. As described above, the baseline PES measurement may be performed while the R/W head is positioned at one height above the disk. Alternatively, the baseline PES measurement may be based on the PES as the R/W head is slowly stepped down toward the surface of the disk. In one embodiment, the baseline PES measurement is a running average or accumulated mean of the PES over a specified number of earlier DAC counts.

In step 603, the R/W head is stepped down one or more DAC counts toward the surface of the disk. For maximum resolution of touchdown, the R/W head is stepped down a single DAC count. Because in some situations performing a PES measurement at each DAC count may be overly time-consuming, the R/W head may instead be stepped down two or more DAC counts in step 603.

In step 604, a PES is measured and converted to a DFT by methods commonly known in the art. The PES variance is then calculated based on the measured PES and the baseline PES. In one embodiment, the entire PES frequency spectrum is used to calculate the PES variance. In another embodiment, a limited portion of the PES frequency spectrum is used to calculate the PES variance. In yet another embodiment, multiple portions of the PES frequency spectrum are used to calculate the PES variance.

In step 605, touchdown determination is performed, i.e., the PES variance calculated in step 604 is compared to the touchdown criterion. In one embodiment, touchdown is declared when the variance between the measured PES spectrum and the baseline PES spectrum exceeds a specified quantity. In another embodiment, touchdown is declared when the measured PES spectrum exceeds the magnitude of the baseline PES spectrum by a specified multiplicative factor. If touchdown has not occurred, the process returns to step 603. If touchdown has occurred, the process continues to step 606. In step 606, touchdown is declared.

Due to the sensitivity of R/W head to disk spacing to temperature and track location in modern HDDs, method 600 may be used to calibrate touchdown of an R/W head at multiple temperatures and/or track locations. Thus, method 600 may be repeated a number of times for a given R/W head. In one embodiment, method 600 is used to determine touchdown at one or more tracks disposed near the inner diameter and the outer diameter of a disk. In this embodiment, touchdown power for the remaining tracks is interpolated by methods known in the art. In another embodiment, method 600 is used to determine touchdown for each track disposed on the surface of magnetic storage disk. In one embodiment, touchdown is determined using method 600 for one or more tracks at multiple temperatures, e.g., at 0° C. and 50° C., or any set of temperatures that reasonably cover the operating temperature range of the magnetic storage disk, which is from 0° C. to 60° C. In another embodiment, touchdown is determined using method 600 for one or more tracks at a single temperature. The DFH control signal power for each track at different temperatures is then determined by methods known in the art for relative spacing measurement, such as signal amplitude or harmonic ratio measurement.

Method 600 may be performed in a conventional test environment, i.e., in a manufacturing setting. However, because no additional measuring equipment is required for an HDD to perform method 600, an HDD may also perform method 600 whenever it may be deemed necessary. For example, an HDD may perform method 600 on one or more tracks upon each start-up of the HDD, or periodically throughout the life of the HDD. Alternatively, an HDD may perform method 600 on one or more tracks under specific circumstances, e.g., whenever the HDD reaches a certain temperature.

The use of PES variance, as described herein, provides a number of advantages over methods known in the art for determining touchdown. First, no external equipment is required for an HDD to perform touchdown determination. Second, a touchdown determination algorithm based on PES variance provides a reliable method for detecting touchdown, particularly when summing the mean of the difference in PES magnitude squared and/or calculating PES variance using a limited portion of the PES frequency spectrum. Third, minimal head/disk contact is required. For example, measuring touchdown for tracks near the inner and outer diameter of a magnetic storage disk allows touchdown for the remaining tracks to be estimated mathematically.

If touchdown of an R/W head is incorrectly declared to be too low, i.e., the R/W head is "over-driven," there is a significant probability that the R/W head will continue to operate normally until the HDD is operated in non-standard conditions, e.g., low barometric pressure or high temperature, and then fail unexpectedly. To minimize this risk, it is contemplated that multiple touchdown determination methods may be performed on an R/W head. Touchdown power is then determined to be the lowest DFH power setting for which any one of the methods meets its touchdown criteria. For example, method 600 in FIG. 6 can be performed in conjunction with other touchdown detection schemes known in the art. One such scheme is to observe the gain of the read channel VGA as DFH power is increased, and declare touchdown when further increases in DFH power do not produce significant decreases in VGA gain. Another is to observe acoustic output of the HDD by placing a microphone near the R/W head and declare touchdown when a pre-determined level of acoustic output is detected. Another is to observe overall servo track TMR of the R/W head as DFH power is increased and declare touchdown when the TMR exceeds a specified level. Another is to observe modulation of the read signal from the R/W head and declare touchdown when a specified level of modulation is reached.

Figure 7:
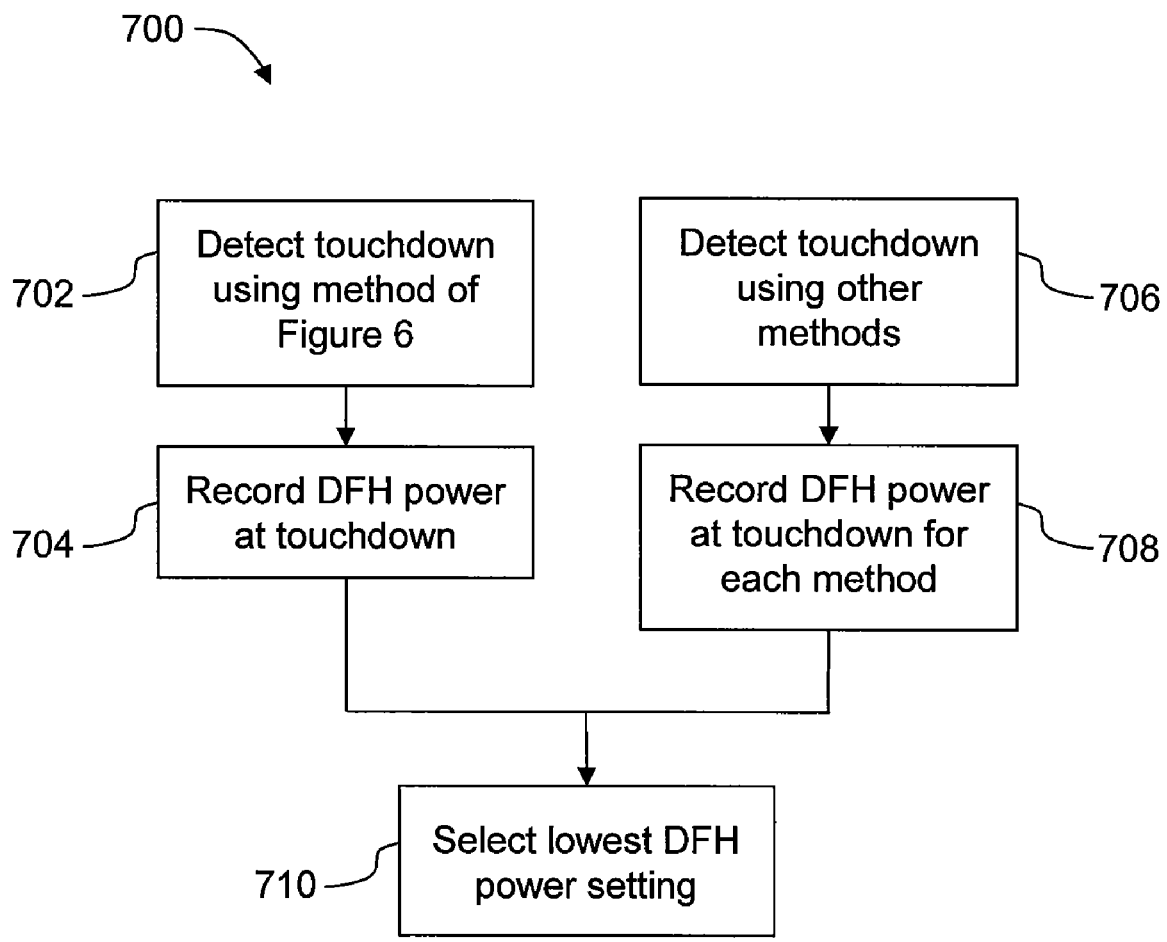
FIG. 7 is a flow diagram illustrating the method for determining DFH power corresponding to touchdown of an R/W head against a magnetic storage disk, according to an embodiment of the invention.

FIG. 7 is a flow diagram summarizing a method 700 for determining touchdown of an R/W head against a magnetic storage disk using multiple touchdown detection schemes, according to an embodiment of the invention. In step 702, touchdown is determined using method 600 in FIG. 6. In step 704, touchdown power for method 600, i.e., the DFH power level at touchdown, is recorded. In step 706, touchdown is determined using one or more of the methods known in the art described above, i.e., by observing VGA gain, acoustic output, servo track TMR, and/or modulation of the read signal, while increasing DFH power. In step 708, touchdown power for each additional method is recorded. In step 710, the lowest recorded DFH power setting from steps 704 and 708 is set as the touchdown power for the R/W head with respect to the magnetic storage disk.

While the foregoing is directed to embodiments of the present invention, other and further embodiments of the invention may be devised without departing from the basic scope thereof, and the scope thereof is determined by the claims that follow.

What is claimed is:

1. A method for detecting touchdown between a magnetic head and a recording medium, comprising:
    measuring a baseline position error signal of the magnetic head with the magnetic head at a baseline position;
    measuring additional position error signals of the magnetic head with the magnetic head positioned successively closer to the recording medium with each additional measurement;
    converting each of the position error signals from a time domain into a frequency domain; and
    detecting touchdown based on a combined variance value that is computed from variances in the position error signals at each of a discrete number of frequencies that are within a selected frequency band in the frequency domain.

2. The method according to claim 1, further comprising:
    driving the magnetic head from the baseline position to a first position that is closer to the recording medium than the baseline position and then measuring the additional position error signal with the magnetic head at the first position; and
    driving the magnetic head from the first position to a second position that is closer to the recording medium than the first position and then measuring the additional position error signal with the magnetic head at the second position.

3. The method according to claim 2, further comprising:
    until touchdown is detected, driving the magnetic head to positions that are successively closer to the recording medium and then measuring the additional position error signals at said positions.

4. The method according to claim 1, wherein the selected frequency band has a lower bound that is greater than 2000 Hz.

5. The method according to claim 1, wherein the combined variance value is a sum total of each of said variances.

6. The method according to claim 5, wherein each variance in the position error signals is a variance between one of the additional position error signals and the baseline position error signal at a particular frequency within the selected frequency band.

7. The method according to claim 5, wherein each variance in the position error signals is a variance between two successively measured additional position error signals.

8. The method according to claim 1, further comprising:
    measuring a temperature;
    recording a drive power for the magnetic head when touchdown is detected; and
    calibrating the magnetic head based on the temperature and the recorded drive power.

9. A method for detecting touchdown between a magnetic head and a recording medium, comprising:
    driving the magnetic head to a first height;
    measuring a first position error signal of the magnetic head at the first height;
    driving the magnetic head to a second height;
    measuring a second position error signal of the magnetic head at the second height;
    converting each of the position error signals from a time domain into a frequency domain;
    selecting a frequency band in the frequency domain with a lower bound greater than 2000 Hz; and
    determining if touchdown has occurred based on the first and second position error signals at each of a number of discrete frequencies that are within the selected frequency band.

10. The method according to claim 9, further comprising:
    if touchdown is determined to have occurred, recording a power setting needed to drive the magnetic head to the second height.

11. The method according to claim 9, further comprising:
    if touchdown is determined to have not occurred, driving the magnetic head to a third height and measuring a third position error signal of the magnetic head at the third height.

12. The method according to claim 11, further comprising:
    converting the third position error signal from a time domain into a frequency domain; and
    determining if touchdown has occurred by evaluating differences between the third position error signal and one or more other position error signals at each of the number of discrete frequencies that are within the selected frequency band in the frequency domain.

13. The method according to claim 12, wherein the one or more other position error signals include the second position error signal.

14. The method according to claim 13, wherein the one or more other position error signals further include the first position error signal.

15. The method according to claim 12, wherein the one or more other position error signals include a baseline position error signal.

16. The method according to claim 9, wherein touchdown is determined to have occurred based on a combined variance value that is computed from variances in the first and second position error signals at each of the discrete number of frequencies that are within the selected frequency band in the frequency domain.

17. The method according to claim 16, wherein the combined variance value is a sum total of each of said variances.

18. The method according to claim 17, wherein the selected frequency band has an upper bound that is at a Nyquist frequency of the position error signals.

* * * * *